United States Patent [19]

Trail

[11] 4,133,470

[45] Jan. 9, 1979

[54] METHOD AND APPARATUS FOR FABRICATING PIPE CENTRALIZER OR THE LIKE

[75] Inventor: Melvin P. Trail, Houston, Tex.

[73] Assignee: Chromalloy American Corporation, St. Louis, Mo.

[21] Appl. No.: 808,900

[22] Filed: Jun. 22, 1977

[51] Int. Cl.$^2$ ............................................. B23K 37/04
[52] U.S. Cl. .................................. 228/44.1 R; 228/49; 228/182; 228/212
[58] Field of Search .................... 228/44.1 R, 44.1 A, 228/47, 48, 49 R, 49 A, 212, 178, 182; 219/159

[56] References Cited

U.S. PATENT DOCUMENTS

| | | | |
|---|---|---|---|
| 2,799,085 | 7/1957 | Baker et al. | 228/212 X |
| 3,634,648 | 1/1972 | Morris et al. | 228/48 X |
| 3,970,232 | 7/1976 | Melton | 228/48 X |
| 4,014,495 | 3/1977 | Oda et al. | 228/25 X |

Primary Examiner—Al Lawrence Smith
Assistant Examiner—K. J. Ramsey

[57] ABSTRACT

A method and apparatus for fabricating pipe centralizers or the like including supporting the centralizer end collars upon a pair of axially aligned spaced apart mandrels, supporting the bows of the centralizers circumferentially about the end collars, simultaneously welding each end of one of the bows to each collar, rotating the mandrels with the collars and bows supported thereon about the axes thereof, and simultaneously welding each end of another of the bows to the collars. The mandrels include a pair of collar clamps for retaining each collar against a collar shoulder, and a plurality of pivotally mounted arms for holding the bows in contact with the collar. At least one of the mandrels is movable axially relative to the other so that centralizers of different lengths may be fabricated, and so that completed centralizers may be removed from the mandrels. The welding is accomplished by a pair of welding heads supported adjacent the mandrels and movable radially and axially relative to the mandrels to perform fillet welds along the edges of the bows.

20 Claims, 13 Drawing Figures

METHOD AND APPARATUS FOR FABRICATING PIPE CENTRALIZER OR THE LIKE

BACKGROUND OF THE INVENTION (a) Field of the Invention

This invention relates to automatic welding method and apparatus, and more particularly to a method and apparatus for fabricating pipe centralizers or the like.

(b) Description of the Prior Art

One of the final steps in completion of an oil and gas well is running and cementing the casing. The casing is first run into the hole, and then a cement slurry is forced through the casing to displace drilling mud from the borehole. The cement is then allowed to harden in the annular space between the casing and the borehole, to thereby prevent the movement of fluids between formations. Cementing also serves to support, and prevent corrosion of, the casing.

In order to obtain effective cementing, it is necessary that the casing be centred within the hole so that the cement slurry may completely surround the casing. To achieve such centering, devices known as centralizers are attached at intervals to the casing as it is run.

A centralizer is comprised generally of a pair of end collars adapted to be placed around the casing, and a plurality of bows connecting the collars. The collars are either hinged rings which may be latched about the casing or solid rings which may be slipped over the casing. The internal diameter of the collars is substantially the same as outside diameter of the casing with which they are to be used, and range in size from 2⅜ to 60 inches. The bows may be either of spring steel or solid bars. The number of bows in any centralizer depends upon the size of the end collar, with larger diameter centralizers usually containing more bows.

Heretofore, centralizers have been fabricated manually. The initial steps of centralizer fabrication are performed by a welder's helper. The helper first places the end collars upon a work piece holder which usually takes the form of a horizontal metal pipe having marks thereon to enable the helper to space the end collars the proper distance apart. The helper then places a bow upon the collars such that each end thereof is in contact with one of the collars, whereupon he tack welds the ends to the collar. He then rotates the collars with the bow tacked thereto a distance determined by the number of bows to be contained by the finished centralizer and tacks another bow to the collars. The operator continues the process until all of the bows have been tacked to the collars, whereupon he delivers the partially fabricated centralizer to a welder, who lap welds the ends of each bow to the collars to which they have been tacked.

This method of fabricating centralizers is both expensive and inefficient. It is expensive in that it takes a substantial amount of labor to fabricate each centralizer. The welding steps must be performed by welders of at least some experience, and who must therefore be paid a rather high wage. It is inefficient in that it is slow and the output of centralizers produced thereby is limited. It is also inefficient in that it diverts welders from more productive jobs within the shop.

SUMMARY OF THE INVENTION

It is therefore an object of the present invention to provide a method and apparatus by which pipe centralizers may be fabricated using a minimum of manual labor, and particularly without the use of experienced welders. It is a further object of the present invention to provide a method and apparatus by which centralizers may be fabricated quickly. It is further object of the present invention to provide a method and apparatus that will, by reducing to a minimum the use of manual labor, produce centralizers of higher and more uniform quality.

Breifly stated, these and other objects of the present invention are accomplished by providing a method and apparatus for automatically welding the bows to the collars. The apparatus includes a pair of opposed coaxially aligned spaced apart mandrels, having means for retaining thereon the end collars and for supporting in contact with the end collars a plurality of bows. At least one of the mandrels is axially movable relative to the other mandrel in order that centralizers of varying length may be fabricated thereon, and that finished centralizers may be removed therefrom. The mandrels are also movable from a position in which an operator may load the centralizer parts to a position in proximity of a pair of welding heads which perform the welding.

Each welding head includes a pair of welding torches, the ends of which are spaced apart as wide as are the bows to be welded. Means are provided for moving the welding heads radially and axially relative to the mandrels to perform the welds. Means are also provided for rotating the mandrels about the axes thereof between, and indexing in, a plurality of welding positions.

DESCRIPTION OF THE PREFERRED EMBODIMENT

Figure 1:
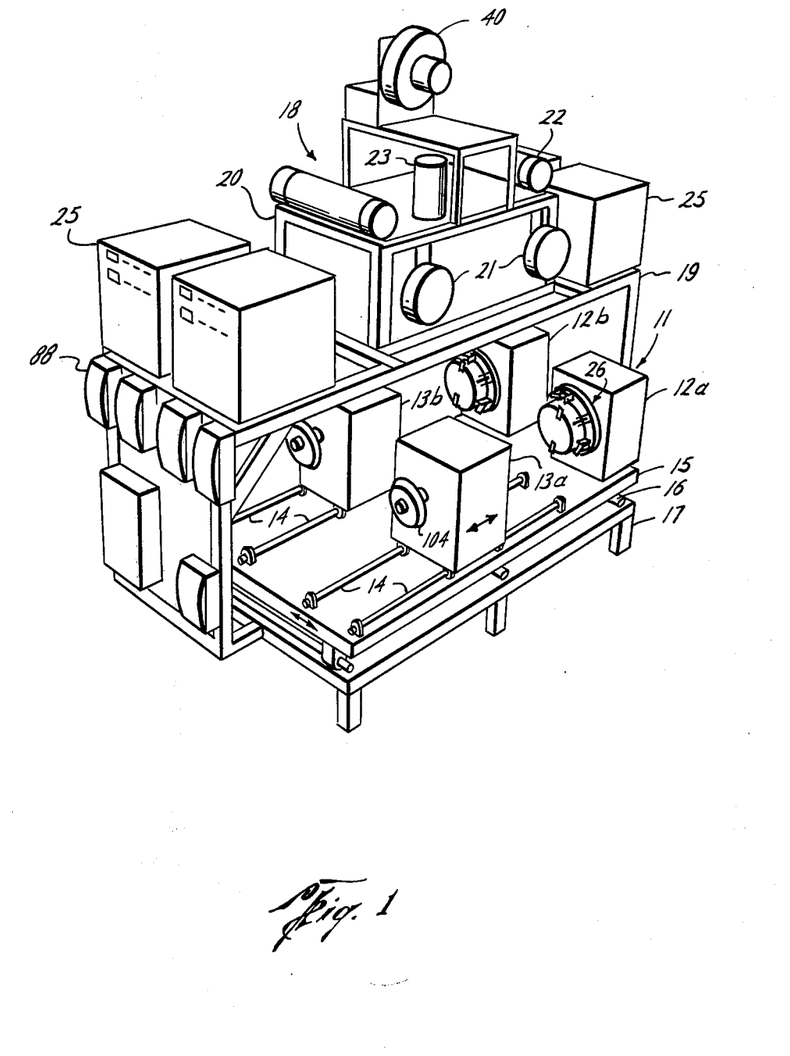
FIG. 1 is a perspective view of the preferred embodiment of the apparatus showing the major components thereof.

Referring now to the drawings, an overall view of the apparatus of the preferred embodiment of the present invention is illustrated in FIG. 1. The apparatus includes means for holding the centralizers during fabrication, designated generally by the numeral 11, and means, designated generally by the numeral 18, for automatically welding the centralizer bows to the end collars.

In the preferred embodiment, two sets of holding means 11 are provided so that centralizer parts may be loaded in, and completed centralizers removed from, one set of holding means 11 while the centralizer parts held by the other set of holding means are being welded. Holding means 11 includes a pair of headstocks 12a and 12b and a pair of tailstocks 13a and 13b, each having associated therewith a mandrel, generally designated by the numeral 26. There are thus two pairs of opposed axially aligned mandrels 26 mounted in a side-by-side fashion. Tailstocks 13a and 13b are slidingly mounted on tacks 14 so as to be axially movable with respect to headstocks 12a and 12b. Headstocks 12a and 12b and tracks 14 are mounted on a rectangular carriage 15 which in turn is slidingly mounted on tracks 16 so as to be shiftable laterally upon a rectangular base 17 so that holding means 11 may be moved into proximity with welding means 18, which are mounted on a frame 19 along the central axis of base 17. Frame 19 also supports various pieces of auxiliary equipment such as power supplies 25 and fuze boxes 88. Welding means 18 are suppported for vertical movement by a lift frame 20. Lift frame 20 also supports a blower 40, wire feeding means 22, wire spools 21, and a welding torch lift 23.

Figure 2:
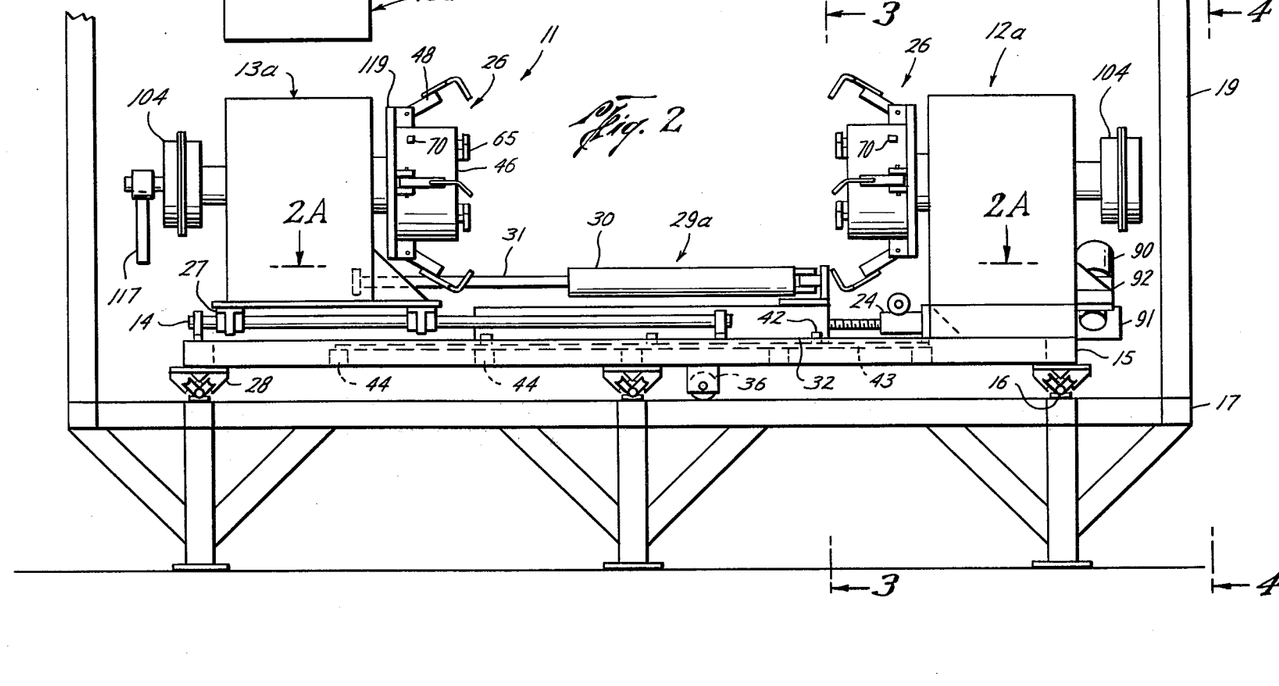
FIG. 2 is a partial side elevation view of the apparatus of the preferred embodiment showing the mandrels and the means for moving the mandrels axially relative to each other.
Figure 2A:
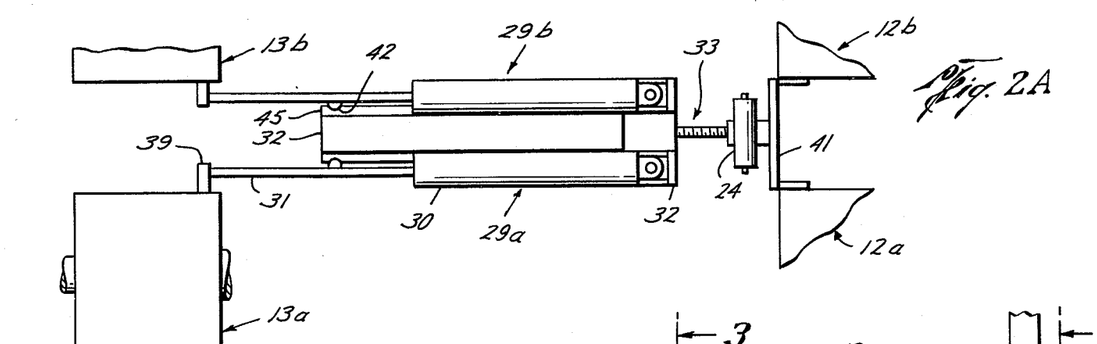
FIG. 2A is a top partial sectional view taken generally along lines 2A—2A of FIG. 2 showing the means for moving the mandrels axially relative to each other in greater detail.
Figure 7:
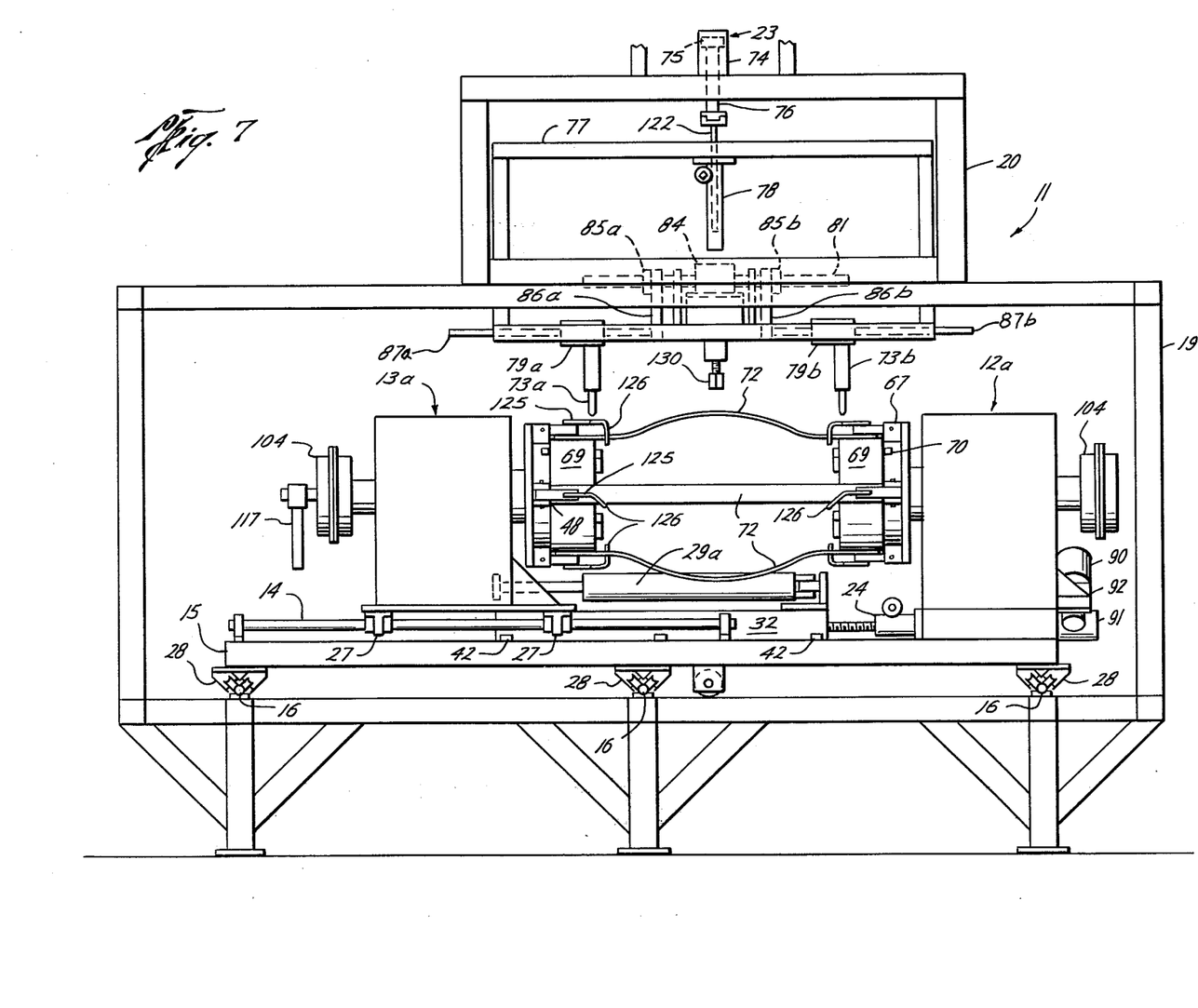
FIG. 7 is a side elevation view showing a centralizer mounted on the mandrels and details of thw welding means.

Referring now to FIGS. 2 and 2A, tailstocks 13a and 13b are mounted on bearings 27 for axial movement with respect to headstocks 12a and 12b on tracks 14 by the action of pneumatic assemblies 29a and 29b, respectively. Pneumatic assemblies 29a and 29b each include a pneumatic cylinder 30, a piston (not shown), and a rod 31. Each cylinder 30 is attached to a cylinder support 32 which is slidingly mounted to base 17, as will be more fully described hereinafter. Each rod 31 is attached to a bracket 39 on each tailstock 13a and 13b. Pneumatic assemblies 29a and 29b are operable independently of each other so that holding means 11 may be used independently of each other. In FIGS. 2 and 2A, pneumatic assemblies 29a and 29b are both shown in the extended position, which is used when removing completed centralizers for mandrels 26. During fabrication, pneumatic assemblies 29a and 29b are retracted, as shown in FIG. 7.

Figure 3:
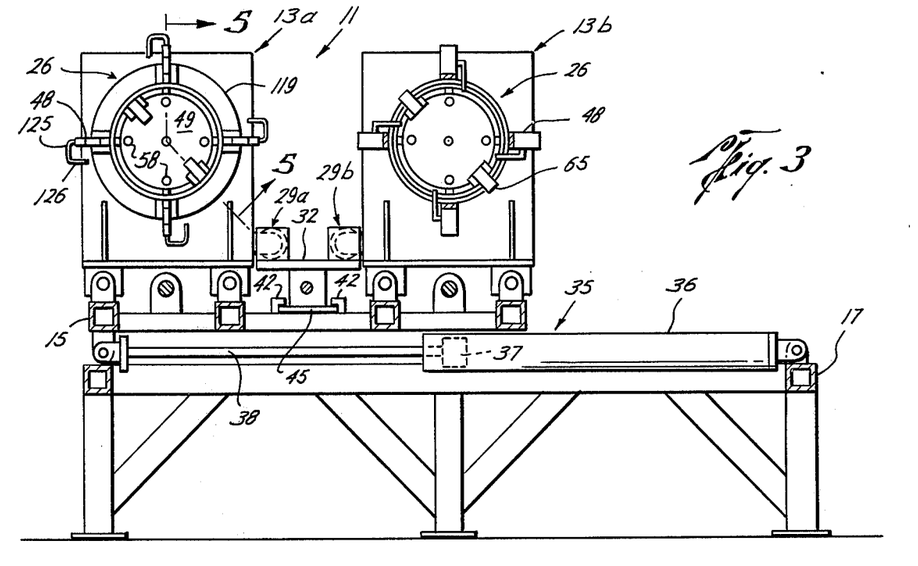
FIG. 3 is an end view taken along line 3—3 of FIG. 2 showing details of the construction of the mandrels, and the means for shifting the mandrels laterally.

Pneumatic assemblies 29a and 29b are arranged so as to extend or retract fully upon the appropriate application of air thereto, and therefore in order to fabricate centralizers of different lengths, adjustment means 33 are provided for varying the distance between the mandrels 26 when pneumatic assemblies 29a and 29b are retracted. Adjustment means 33 include a crank operated screw-type jack 24 attached at one end to a brace 41 between headstocks 12a and 12b and at the other end to cylinder support 32. Cylinder support 32 is supported by a plate 43 mounted on cross members 44. The bottom of cylinder support 32 is a flat plate 45 which engages notched guides 42 to keep cylinder support 32 properly centered, as shown in FIG. 3. The operation of jack 24 causes support 32 to slide axially on plate 43 and thereby causes tailstocks 13a and 13b to move axially with respect to headstocks 12a and 12b.

Figure 4:
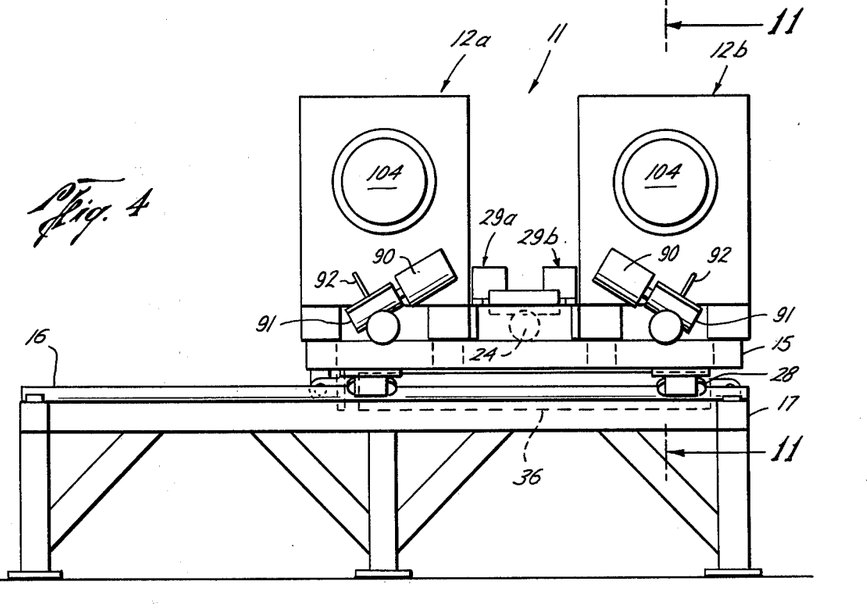
FIG. 4 is an end view taken along line 4—4 of FIG. 2 showing the back sides of the mandrels.

Referring now to FIGS. 3 and 4, carriage 15, which supports holding means 11, is mounted by means of bearings 28 on tracks 16 so as to be shiftable from one side of frame 17 to the other so that when headstock 12b and tailstock 13b are centered on base 17 and therefore aligned with welding means 18, headstock 12a and tailstock 13a are adjacent one side of base 17, as is illustrated in FIG. 3. Similarly, when headstock 12a and tailstock 13a are centered on base 17, headstock 12b and tailstock 13b are adjacent the other side of base 17, as illustrated in FIG. 4. Carriage 15 is shifted by means of pneumatic assembly 35, which includes a cylinder 26 attached to frame 17 a piston 37 within cylinder 36, and a rod 38 connected to piston 37 and attached to carriage 15.

Figure 5:
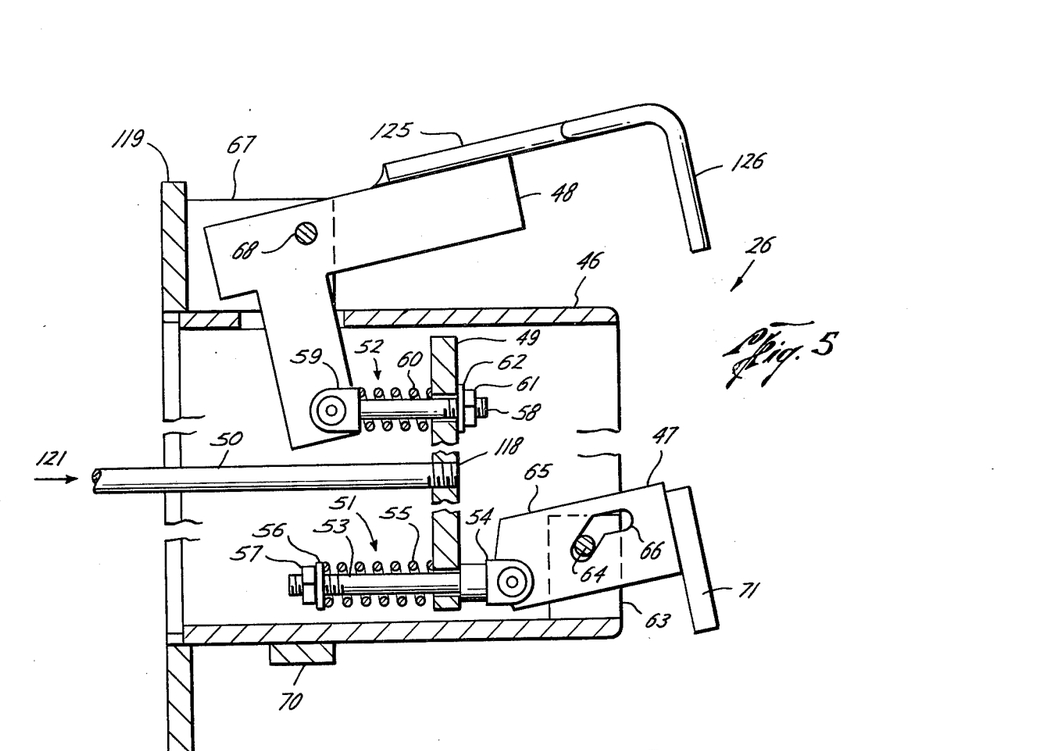
FIG. 5 is a sectional view taken along line 5—5 of FIG. 3 showing the details of the mandrels in the open position.
Figure 6:
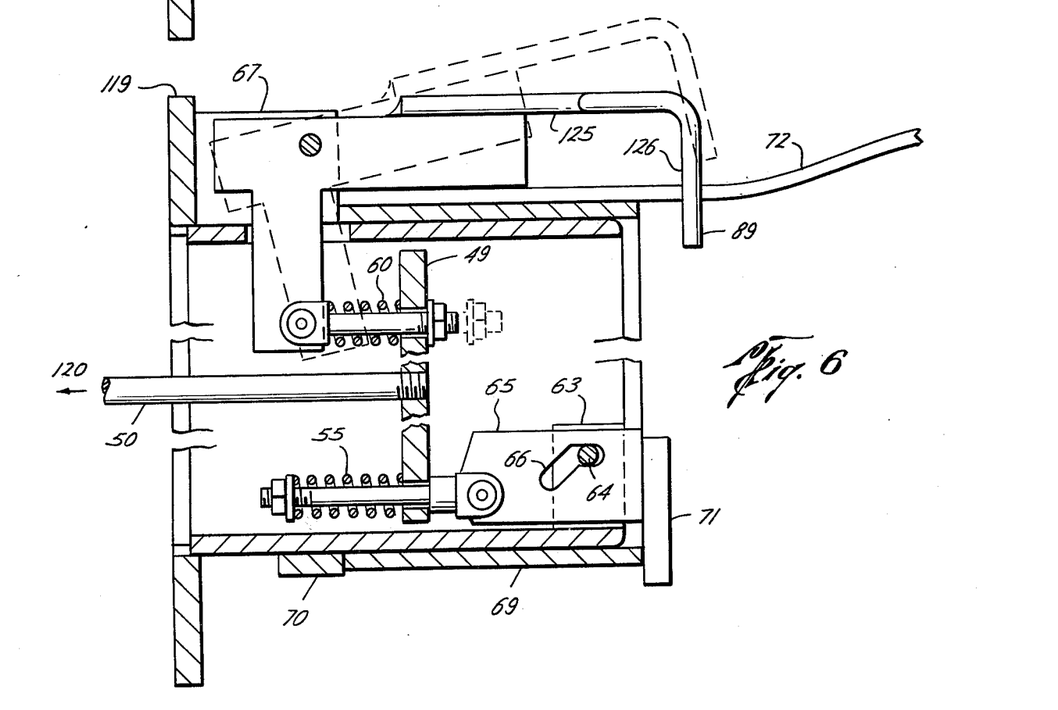
FIG. 6 is a sectional view generally similar to FIG. 5 showing the mandrels in the closed position.

Referring now to FIGS. 5 and 6, the details of the construction of mandrels 26 are illustrated. Each mandrel 26 includes a cylindrical body 46 attached to a plate base 119, a air of collar clamps 47, and a plurality of arms 48. Clamps 47 and arms 48 are movable between an open position, as shown in FIG. 5, and closed position as shown in FIG. 6. Means for opening and closing clamps 47 and arms 48 include a plate 49 and a rod 50 operated by a pneumatic diaphragm 104, best shown in FIG. 11. Plate 49 is axially movable within body 46 by means of rod 50 and is connected to clamps 47 by linkage means 51, and to arms 48 by linkage means 52. Linkage means 51 includes a threaded shaft 53 inserted through a hole in plate 49, a clevis 54 pivotally attached to clamp 47, and a spring 55 compressed between plate 49 and a washer 56 and an associate nut 57. Linkage means 52 are generally similar to linkage means 51 and include threaded rod 58, a clevis 59 attached to arm 48, and a spring 60 compressed between clevis 59 and plate 49.

Clamps 47 are movably mounted to body 46 between a pair of plates 63 having a pin 64 therethough. The sliding portion 65 of clamp 47 has a J-shaped slot 66 which engages pin 64. As plate 49 moves in the direction shown by arrow 120 in FIG. 6, pin 64, co-operating with slot 66, causes clamp 47 to pivot upon clevis 54 and move radially and axially.

Each arm 48 is mounted between a pair of plates 67 having a pin 68 therethrough. Each arm 48 is pivotally attached to pin 68 and the movement of plate 49 in the direction of the arrow 120 in FIG. 6 causes arm 48 to pivot inwardly toward body 46.

Figure 8:
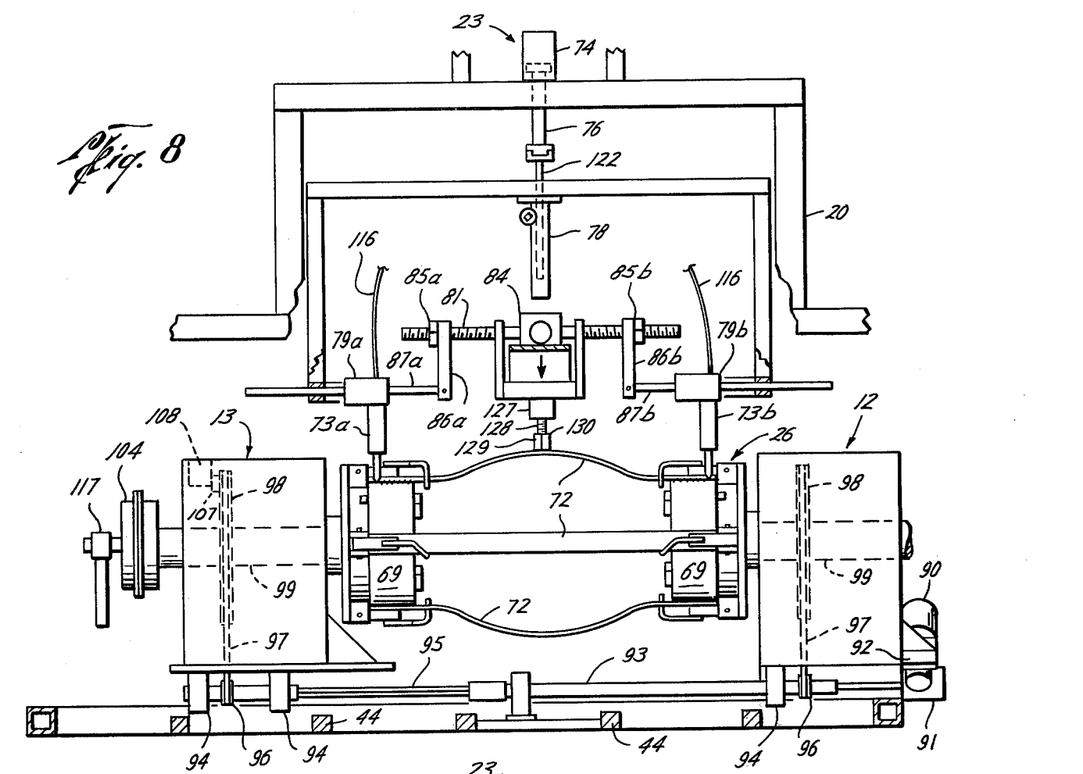
FIG. 8 ia a partially fragmented elevation view similiar to FIG. 7 showing the welding means in the welding position.

Each arm 48 has attached thereto by welding or the like a curved bow clip 125. As shown for example in FIG. 7 each bow clip 125 extend along the line of arm 48 to a point where clip 125 bends downwardly at about a 45° angle Clip 125 continues downwardly to a point approximately one-half of a bow width below the center of arm 48 at which point clip 125 bends approximately 90° inwardly toward the center of mandrel 26. The inwardly bent portion 126 of clip 125 forms a jig to aid in the proper alignment of each bow 72 under arms 48. As shown in FIGS. 7 and 8, the mandrels 26 of each pair of opposed mandrels 26 are mirror images of each other.

To mount centralizer parts on each mandrel 26, a diaphragm 104 is actuated to move rod 50 in the direction shown by the arrow 121 in FIG. 5 to move clamps 47 and arms 48 to the open position, as shown in FIG.

5. An end collar 69 may then be mounted over body 46 and slid into abutment with plates 67 and a lug 70 radially adjacent each collar clamp 47. Plates 67 and lugs 70 collectively form a collar shoulder. Lug 70 also provides a benchmark to aid in properly aligning hinged type collars (not shown) on mandrels 26.

With a collar 69 so mounted, diaphragm 104 is actuated to move rod 50 in the direction indicated by arrow 120 to close clamps 47 and arms 48, as shown in FIG. 6. The holding portion 71 of clamp 47 holds collar 69 tightly against the shoulder under tension of spring 55. With a collar 69 so supported on both mandrels 26 of the opposed pair of mandrels the machine operator inserts the ends of one bow 72 of the centralizer between a pair of arms 48 and collars 69. The operator stand adjacent the apparatus, facing the opposed pair of mandrels 26 approximately equidistant therebetween, holding an end of one bow 72 in each hand. The operator then grasps a bow clip 125 with some of his fingers on each and and pulls outwardly thereon to compress spring 60, as shown in phantom in FIG. 6. The operator then inserts the bow 72 between the outwardly pulled arms 48 and collars 69 until the lower edge of bow 72 rests on inwardly bent portion 126 of bow clip 125, whereupon the operator releases bow lips 125. The operator then actuates rotating and indexing means, as will be fully described hereinafter, to bring another pair of arms 48 into position to be loaded.

Figures 11, 12:
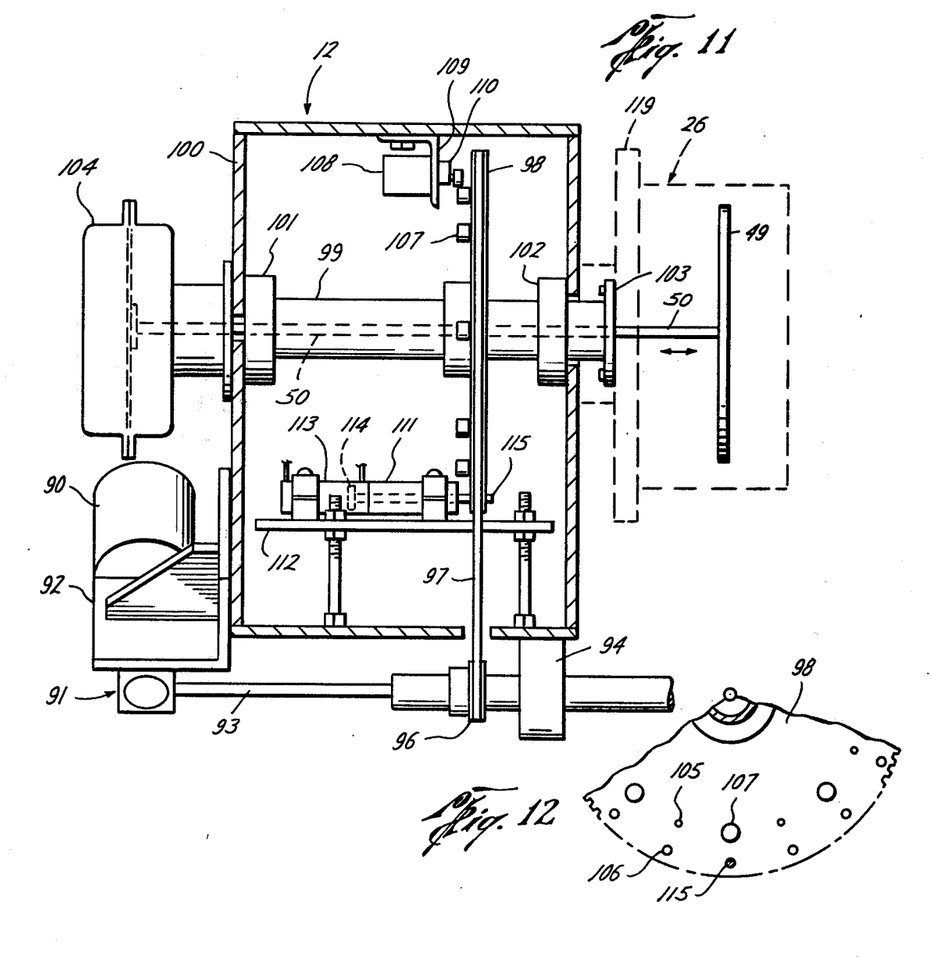
FIG. 11 is a sectional view taken along line 11—11 of FIG. 4 showing details of the indexing means.
FIG. 12 is a fragmentation view showing details of the indexing means.

In order that centalizers with varying diameters and numbers of bows may be fabricated, mandrels 26 may be of various diameters and numbers of arms 48 and are interchangable. Base 119 of each mandrel 26 is adapted to be connected to a flange 103, as shown in FIG. 11. Mandrel 26 is mounted by screwing the threaded end 118 of rod 50 into plate 49 and connecting base 119 to flange 103.

Figure 9:
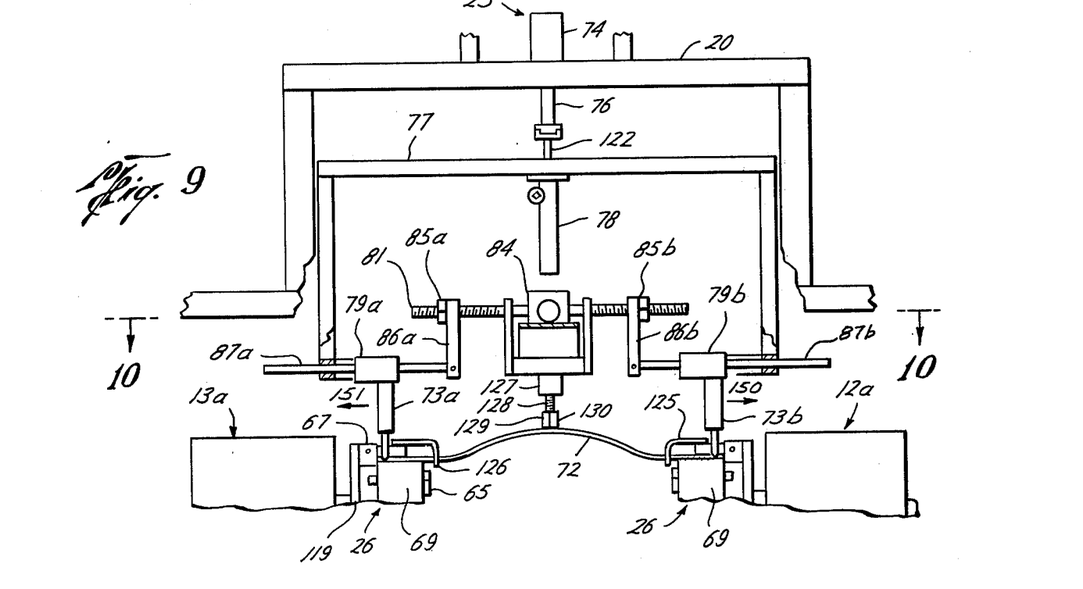
FIG. 9 is fragmentation view generally similar to FIG. 8 showing details of the movement of the welding torches.

Referring now to FIGS. 7-9, the plates of a centralizer having two collars 69 and four bows 72 are shown loaded in mandrels 26 waiting to be welded by welding means 18. Welding means 18 includes two pair of automatic wire feed gas shrouded welding torches, one pair is designated by the numeral 73a, the other by the numeral 73b. Torches 73a and 73b are movable vertically, and axially relative to mandrels 26, by means of pneumatic torch lift assembly 23. Torch lift assembly 23 is supported by welding head lift frame 20, and includes a cylinder 74, a piston 75, and a rod 76 coupled to welding head carriage 77 that is vertically movable mounted within frame 20 and that supports torches 73a and 73b. Torches 73a and 73b are moved to and from a position adjacent the ends of bows 72 to be welded to collar 69 by the appropriate application of air to cylinder 74.

Torch lift assembly 23 is arranged so that carriage 77 is either fully raised or fully lowered--the stroke of rod 76 is always the same. Therefore, in order that the apparatus of the present invention may be used to fabricate centralizers of different diameters, a jack 78 is provided to raise and lower carriage 77 relative to torch lift assembly 23. Jack 78 is attached to carriage 77 and the extensible member 122 thereof is coupled to rod 76. By the operation of jack 78, rod 76 is effectively lengthened or shortened.

Figure 10:
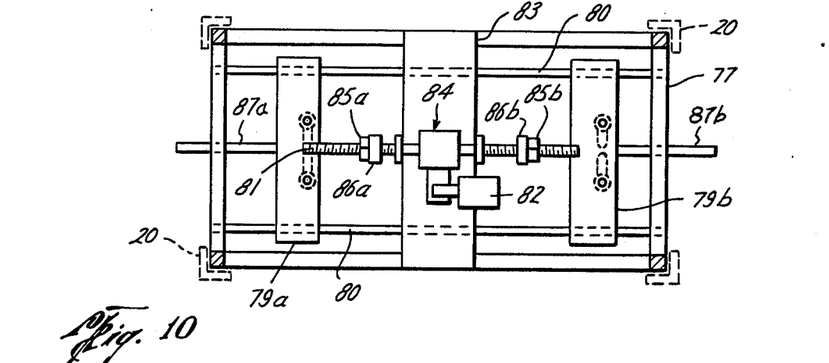
FIG. 10 is partial top sectional view taken along line 10—10 of FIG. 9 showing details of the welding means.

After torch lift asembly 23 has been actuated to lower torches 73a and 73b to the position adjacent the bow 72 to be welded to collar 69, means are provided for moving torches 73a and 73b axially with respect to mandrels 26 to thereby make fillet welds along edges of bows 72. Torches 73a and 73b are suspended from a pair of support bars 79a and 79b respectively. Support bars 79a and 79b are slidingly mounted by bushings (now shown) on rails 80 supported by carriage 77 as shown in FIG. 10. Supports bars 79a and 79b are moved axially on rails 80 by means of a screw 81 driven by a motor 82. Motor 82, which is mounted in a support plate 83 that is attached to carriage 77, drives screw 81 by a system of gears in gear box 84.

The rotation of screw 81 drives torches 73a and 73b axially by means of nut members 85a and 85b, arms 86a and 86b, and a pair of rods 87a and 87b, respectively. Arms 86a and 86b (as best seen in FIGS. 8 and 9) are rigidly connected between nut member 85a and 85b respectively and rods 87a and 87b. Rods 87a and 87b are mounted for axially sliding movement with respect to carriage 77 and are fixed to support bars 79a and 79b. Thus, the rotation of screw 81 causes axial movement of torches 73a and 73b with respect to mandrels 26. The axial position of support bar 79a is movable on rod 87a so that distance between support bars 79a and 79b, therefore torches 73a and 73b, may be revised to accommodate centralizers of different lengths.

Support plate 83 has extending downwardly therefrom a knob 130. Knob 130 serves to precisely longitudinally align each bow 72 upon collars 69. When carriage 77 is lowered, nob 130 presses against bow 72 and causes the ends thereof to extend into contact with plates 67 of mandrels 26. Longitudinal axial misalignment is thereby removed.

The length of knob 130 may be varied to accommodate bows 72 of various curvature. Knob 130 has a bolt headed portion 129 and a threaded portion 128 that is screwed into a socket 127 attached to support plate 83. By screwing knob 130 upwardly or downwardly, the length thereof may be changed, and centralizers with bows 72 of various curvatures may be fabricated.

Since torches 72a and 72b are arranged to weld a bow 72 located directly thereunder, means are provided by which mandrels 26 may be rotated between, and indexed in, a plurality of welding positions. As is best shown in FIG. 8, rotation is provided to mandrels 26 by means of a motor 90 and a gear box and clutch assembly, designated generally by the numeral 91, supported by bracket 92. Motor 90, through assembly 91, rotates shaft 93 which is supported beneath headstock 12 and tailstock 13 by bearings 94. The length of shaft 93 is variable by means of a telescoping member 95 splined to shaft 93 so that headstocks 12a and 12b and tailstocks 13a and 13b may be moved axially relative to each other.

The rotation of shaft 93 is transmitted to each mandrel 26 by means of a drive sprocket 96 splined upon shaft 93, connected by means of an endless chain 97 to a timing wheel 98 that is splined upon a shaft 99 in each headstock 12a and 12b and tailstock 13a and 13b. As best illustrated in FIG. 11 shaft 99 is rotationally mounted in a case 100 by means of bearings 101 and 102. Shaft 99 is connected to mandrel 26 by flange 103. Shaft 99 is also connected to pneumatic diaphragm 104 which operates rod 50. The rotation of shaft 99 causes the rotation of mandrels 26 and diaphragm 104.

The means for interrupting the rotation of, and thereby indexing mandrels 26 in a plurality of welding positions, are located in headstocks 12a and 12b and are illusrated in FIGS. 11 and 12. Timing wheel 98 has therein a plurality of inner cam holes 105, circumferentially spaced thereabout, and an equal number of outer alignment holes 106 radially coincident with holes 105.

The angular positioning of holes 105 and 106 coincides with the angular positioning of the bows 72 of the centralizers to be fabricated. So that the apparatus may be used to fabricate centralizers having as few as four bows 72 or as many as ten bows 72, a plurality of holes 106 and 106 must be provided, and the angular spacing thereof corresponds with the different angular spacing of bows on different centralizers.

Each cam hole 105 is adapted to accommodate a cam 107 therein. Cams 107 are placed in holes 105 to correspond with the position of the bows 72 to be welded. FIGS. 11 and 12 illustrate the positioning of cams 107 for the fabrication of eight bow centralizers; however, centralizers with different numbers of bows may be fabricated by inserting different numbers of cams 107 in holes 105.

Cams 107 interrupt the rotation of mandrel 26 by operation of a switch 108. Switch 108 is mounted to the top of case 100 by means of a bracket 109 and is operated by a cam follower 110. The end of cam follower 110 is aligned with torches 73a and 73b so that when cam follower 110 is lifted by cam 107, cam 107 is generally aligned with torches 73a and 73b. The lifting of cam follower 110 signals the clutch in assembly 91 to disengage and thereby stop the rotation of shaft 93. When shaft 93 stops, mandrel 26 stops, and the bow 72 on top is generally aligned with torches 73a and 73b.

Precise alignment of mandrels 26 is accomplished by means of a pneumatic drift in 111. Pneumatic drift pin 111 is supported on a plate 112 mounted to the bottom of case 100 and includes a cylinder 113 and a piston 114 that actuates a pin 115. The lifting to cam follower 110, in addition of signaling the disengagement of the clutch, signals pneumatic drift in 111 to thrust pin 115 into one of the holes 106 in wheel 98. Holes 106 are tapered such that pin 115 brings timing wheel 98, and therefore mandrel 26 into substantially perfect alignment with torches 73a and 73b.

A switch 108 is located in each tailstock 13a and 13b, and the timing wheels 98 therein are each provided with a single cam 107. Cams 107 associated with tailstocks 13a and 13b are arranged to signal the completion of the welding sequence, as will be fully detailed hereafter.

In operation, the operator first determines the type of centralizer to be fabricated. After having determined the diameter and length of the centralizer, and the number and curvature of bows 72 to be used, the operator actuates pneumatic assembly 35 to bring carriage 15 to the side of the apparatus at which he is standing. (For purposes of this example of operation, the operator is standing on the side adjacent headstock 12a and tailstock 13a). The operator then chooses a pair of mandrels 26 having the appropriate diameter and number of arms 48, and mounts those mandrels 26 upon headstock 12a and tailstock 13a by means of flange 103 at the end of shaft 99. The operator then operates screw jack 24 of length adjustment mechanism 33 to properly space apart opposed mandrels 26 and slides support bar 79a axially along rod 87a until torches 73a are properly spaced apart from torches 73b. The operator then adjusts the length of knob 130 as appropriate for the curvature of bow 72 to be used. He then inserts cams 107 in the approriate cam holes 105 in timing wheel 98 in headstock 12a. The operator finally inserts a single cam 107 in one cam hole 105 in timing wheel 98 in tailstock 13a.

After having set up the apparatus, the operator actuates diaphragms 104 to open clamps 65 and 48. The operator then slides a collar 69 over each mandrel 26 and actutes diaphragms 104 to close clamps 65 and arms 48. Next the operator holding an end of bow 72 in each hand, grasps bow clips 125 with his fingers and pulls arms 48 radially outwardly from collar 69 and inserts therebetween bow 72. The operator then actuates the rotating and indexing means to bring mandrels 26 to a position where another bow 72 may be loaded. The operator continues in the aforesaid manner until all bows 72 have been loaded.

After having loaded the collars 69 and 72, the operator next actuates pneumatic assembly 35 to send carriage 15 to the other side of the apparatus, which places the loaded centralizer parts beneath automatic welding means 18, and initiates the automatic welding sequence. The first step of the automatic sequence is the actuation of torch lift cylinder 23 to lower torces 73a and 73b to the position adjacent the bow 72 to be welded. When torches 73a and 73b reach the welding position, current is supplied to welding wires 116, wire feeding means 22 are actuated, and motor 82 is actuated to move torches 73a and 73b axially with respect to mandrels 26 in the directions of arrows 150 and 151 of FIG. 9. The current supplied by welding wires 116 is conducted to ground by means of a collector 117 rotatably mounted on shaft 99.

When torches 73a and 73b have completed the weld, torch lift cylinder 23 is actuated to raise carriage 77, current to wires 116 is turned off, wire feed means 22 is deactuated, and the direction of current to motor 82 is reversed to return torches 73a and 73b to their initial positions.

When carriage 77 reaches the raised position, pneumatic drift pin 111 is signaled to retact pin 115, and the clutch in assembly 91 is signaled to engage thereby causing mandrels 26 to rotate. The rotation of mandrel 26 is stopped when cam 107 lifts cam follower 110 and actuates switch 108 to signal the disengagement of the clutch and the actuation of pneumatic drift pin 111. Switch 108 also signals the commencement of the welding sequence. The welding and indexing sequences continue until all bows 72 have been welded, at which point single cam 107 mounted in tailstock 13a signals that the welding is completed.

While the just described automatic welding sequence is being performed, a second operator may be loading centralizer parts in the mandrels 26 adjacent the other side of the apparatus. After the second operator has finished loading the centralizer parts and after the welding of the other centralizer is finished, he may actuate assembly 36 to shift carriage 15 back to the other side of the apparatus, whereupon the automatic welding sequence may resume. The first operator may then remove the completed centralizer by opening clamps 47 and arms 48, and moving tailstock 13a axially with respect to headstock 12a. The first operator may then load more centralizer parts.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangments of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus for fabricating pipe centralizers or the like, the combination comprising:
   a pair of opposed coaxially aligned spaced apart mandrels;
   means for retaining an end collar of said centralizer on each of said mandrels, including shoulder means attached at the base of each of said mandrels for engaging the axially outer end of said end collar, a collar clamp movably attached to each of said mandrels for axial and radial movement between an open position in which said end collar may be slid over said mandrels and into engagement with said shoulder and a closed position in which said clamp engages the axially inner end of said collar and forces said axially outer end of said end collar against said shoulder, and means for moving said collar clamp between said open and closed positions;
   movable support means mounted adjacent to each of said mandrels, said support means being movable between an open position in which said collars may be mounted over said mandrels and a closed position in which the ends of a bow are held in contact with said collars;
   and means for welding the ends of said bow to said collars.

2. The apparatus as claimed in claim 1 wherein said support means includes:
   an arm pivotally attached near the base of each of said mandrels and movable between an open position in which said collars may be mounted over said mandrels and a closed position in which an end of said bow is held in contact with said collar by said arm;
   and means for moving said between said open and closed positions.

3. The apparatus as claimed in claim 2, including:
   means for aligning said end of said bow upon said collar.

4. The apparatus as claimed in claim 1 including:
   means for moving at least one of said mandrels axially with respect to the other of said mandrels.

5. The apparatus as claimed in claim 1, wherein said means for welding said ends of said bows to said collars are adapted to substantially simultaneously weld both ends of said bow to said collars.

6. The apparatus as claimed in claim 1, including means for moving said support means between said open and closed positions.

7. In apparatus for fabricating a pipe centralizer or the like, the combination comprising:
   a pair of opposed coaxially aligned spaced apart mandrels;
   means for supporting an end collar of said centralizer upon each of said mandrels;
   means movably attached to said mandrels for supporting a plurality of bows of said centalizer such that one of each of said bows is in contact with each of said collars at circumferentially spaced points;
   means for rotating said mandrels with said collars and bows supported thereon about the axes thereof, said means for rotating said mandrels including a timing wheel attached to for rotation with one of said mandrels, said timing wheel having a plurality of alignment holes circumferentially spaced therein, the location of said holes corresponding to the location of said bows;
   means for aligning said mandrels with said collars and bows supported thereon in a plurality of welding positions, said means for aligning said mandrels including means attached to said timing wheel for actuating switch means for interrupting rotation for said mandrels and means for engaging one of said alignment holes;
   and means for welding each end of one of said bows to said collars while said mandrels are in said welding position.

8. In apparatus for fabricating a pipe centralizer or the like, the combination comprising:
   a pair of opposed coaxially aligned axially spaced apart mandrels, each of which is adapted for retaining thereon an end collar of said centralizer and for supporting in contact with said end collar a plurality of bows of said centralizer;
   means for indexing said mandrels with said collars retained and said bows supported thereon in a plurality of welding positions;
   and means for welding the ends of said bows to said collars while said mandrels are in said welding position;
   wherein each of said mandrels includes:
   a body coaxial with said mandrel having an axially rearward base and axially forward end over which one of said collars may be mounted;
   a shoulder attached to said body near said base;
   a pair of clamps positioned near said forward end of said mandrel, each of said clamps being axially and radially movable between an open position in which said collar may be mounted upon said body, and a closed position in which said collar is held against said shoulder;
   means of moving said clamps between said open and closed positions;
   a plurality of forwardly directed arms each pivotally attached near said base and movable between an open position in which said collar may be mounted over said body and a closed position in which one end of one of said bows is held in contact with said collar;
   means for moving said arms between said open and said closed positions;
   and means for centering an end of each of said bows upon said collar.

9. The apparatus as claimed in claim 8, wherein said means for welding said ends of bows to said collars are adapted to substantially simultaneously weld both ends of said bow to said collar.

10. The apparatus as claimed in claim 7, wherein said engaging means includes:
    a drift pin for engaging one of said alignment holes;
    and means for thrusting said drift pin into said alignment hole.

11. The apparatus as claimed in claim 8 wherein indexing means includes:
    means for rotating said mandrels with said collars and bows supported thereon about the axes thereof;
    and means for interrupting the rotation of said mandrels at a plurality of points.

12. The apparatus as claimed in claim 8 wherein:
    at least one of said mandrels is axially movable relative to the other of said mandrels.

13. The apparatus as claimed in claim 8, including:
means for shifting said mandrels and said welding means relative to each other from a loading position in which said mandrels and said welding means are spaced apart from each other, to a fabricating position in which said mandrels are generally adjacent to each other.

14. The apparatus as claimed in claim 13, wherein said welding means includes:
a pair of welding heads adapted for generally radially inward and outward movement relative to said mandrels when said mandrels and said heads are in said fabricating position;
means for moving said heads from a radially outward position to a radially inward position relative to said mandrels in said fabricating position;
and means for moving said heads axially relative to said mandrels in said radially inward position, thereby welding the ends of one of said bows to said collars.

15. In apparatus for fabricating pipe centralizers or the like, the combination comprising:
a frame supporting said apparatus;
two pairs of mandrels, the mandrels of each of said pairs being opposed, coaxially aligned with, and axially spaced apart from each other, said pairs of mandrels supported by said frame and shiftable thereon;
means for retaining a centralizer end collar upon each of said mandrels;
means for supporting a plurality of centralizer bows circumferentially about each pair of said mandrels such that one end of each of said bows is in contact with each of said collars retained upon said pair;
means supported by said frame for welding the ends of said bows to said collars;
means for shifting each pair of said mandrels to a point substantially adjacent to said welding means;
and means for indexing each pair of said mandrels with said collars and bows supported thereon in a plurality of circumferentially spaced welding positions.

16. The apparatus as claimed in claim 15 including:
means for shifting said pairs of mandrels along one plane.

17. The apparatus as claimed in claim 16 wherein:
said welding means are supported adjacent to said plane.

18. In apparatus for fabricating pipe centralizers or the like, the combination comprising:
a generally rectangular frame for supporting said apparatus;
two pairs of opposed mandrels supported by said frame, the mandrels of each pair being aligned and spaced apart along an axis generally parallel to the sides of said frame and at least one of said mandrels of each of said pairs being movable relative to the other mandrel of said pair along said axis, said pair of mandrels being shiftable in a horizontal plane in a direction generally perpendicular to said sides;
clamps for retaining a centralizer end collar upon each of said mandrels;
means for supporting a plurality of centralizer bows circumferentially about each of said pairs of mandrels such that one end of each of said bows is in contact with each of said collars retained upon said pair;
means for moving said clamps between said open and closed positions;
wherein said means for supporting said bows includes a plurality of forwardy directed arms each pivotally attached near said based and movable between an open position in which said collar may be mounted over said body and a closed position in which one end of said bows is held in contact with said collar;
means for moving said arms between said open and said closed positions;
means for centering an end of each said bows upon said collar;
a pair of welding heads supported above said frame;
means for shifting said each pair of said mandrels to a point substantially below said welding heads;
means for indexing said mandrels such that one of said bows lies substantially below said welding heads;
and means for lowering said welding heads to said one bow lying substantially directly therebelow, to thereby weld said bow to said collars.

19. In a method of fabricating a pipe centralizer or the like, the combination of steps comprising:
supporting a pair of end collars of said centralizer coaxially and spaced apart from each other;
supporting a plurality of bows of said centralizer circumferentially about said collars such that each end of each of said bows is in contact with one of said collars;
providing a welding head spaced apart from said collars;
moving said end collars laterally;
and moving said welding head generally perpendicular to the direction of motion of said collars;
welding one end of one of said bows the collar in contact therewith;
rotating said collars with said bows supported thereon about the axes thereof;
and welding each end of another of said bows to the collar in contact therewith.

20. The method as claimed in claim 19 including the steps of:
supporting a pair of coaxially spaced apart end collars of a second centralizer, with axes thereof generally parallel to those of the first pair of end collars;
supporting a plurality of bows circumferentially about said collars of said second centralizer such that each end of each of said bows is in contact with one of said collars of said second centralizer generally while the bows of said other centralizer are being welded to the said collars thereof;
moving said collars of said other centralizer with said bows thereof welded thereto laterally away from said welding heads;
move said collars of said second centralizers with said bows thereof supported thereon laterally toward said heads;
and welding said bows to said end collars of said second centralizer.

* * * * *

UNITED STATES PATENT AND TRADEMARK OFFICE
CERTIFICATE OF CORRECTION

PATENT NO. : 4,133,470

DATED : January 9, 1979

INVENTOR(S) : Melvin P. Trail

It is certified that error appears in the above-identified patent and that said Letters Patent are hereby corrected as shown below:

Column 2, line 10, delete "Breifly" and insert -- Briefly --; line 57, delete "thw" and insert -- the --; line 59, delete "ia" and insert -- is --; line 60, delete "iar" and insert -- ar --. Column 3, line 25, delete "tacks" and insert -- tracks --. Column 4, line 16, delete "26" and insert -- 36 --; line 54, delete "extend" and insert -- extends --; line 56, between "angle" and "Clip", insert -- . --. Column 5, line 16, delete "stand" and insert -- stands --; line 25, delete "lips" and insert -- clips --; line 29, delete "centalizers" and insert -- centralizers -- ; line 37, delete "plates" and insert -- parts --; line 40, delete "pair" and insert -- pairs --; line 48, delete "movable" and insert -- movably --; line 63, delete "asembly" and insert -- assembly --. Column 6, line 2, delete "now" and insert -- not --; line 4, delete "Supports" and insert -- Support --; line 37, delete both occurrences of "72" and insert at each occurrence -- 73 --. Column 7, line 5, delete "106" and insert -- 105 --; line 29, delete "in" and insert -- pin --;

UNITED STATES PATENT AND TRADEMARK OFFICE
CERTIFICATE OF CORRECTION

PATENT NO. : 4,133,470

DATED : January 9, 1979

INVENTOR(S) : Melvin P. Trail

It is certified that error appears in the above-identified patent and that said Letters Patent are hereby corrected as shown below:

```
line 32, delete "to" and insert -- of --;
line 34, delete "in" and insert -- pin --.
Column 8, line 2, delete "actutes" and insert --
actuates --; line 17, delete "torces" and insert
-- torches --; line 34, delete "retact" and
insert -- retract --; line 51, delete "36" and
insert -- 35 --.  Column 9, line 41, between
"said" and "between", insert -- arm --; line 63,
delete "centalizer" and insert -- centralizer --.
Column 10, line 52, between "of" and "bows", insert
-- said --; line 54, delete "collar" and insert
-- collars --.  Column 12, line 7, delete
"forwardy" and insert -- forwardly --; line 8,
delete "based" and insert -- base --; line 39,
between "bows" and "the", insert -- to --.
```

Signed and Sealed this

Twenty-ninth Day of May 1979

[SEAL]

Attest:

RUTH C. MASON
Attesting Officer

DONALD W. BANNER
Commissioner of Patents and Trademarks